United States Patent
Kayama et al.

(10) Patent No.: US 6,777,368 B2
(45) Date of Patent: Aug. 17, 2004

(54) MOLTEN-SALT TYPE CATALYST

(75) Inventors: Tomoyuki Kayama, Aichi (JP); Hirofumi Shinjoh, Aichi (JP); Yuji Sakakibara, Aichi (JP)

(73) Assignee: Kabushiki Kaisha Toyota Chuo Kenkyusho, Aichi-ken (JP)

( * ) Notice: Subject to any disclaimer, the term of this patent is extended or adjusted under 35 U.S.C. 154(b) by 0 days.

(21) Appl. No.: 10/033,920

(22) Filed: Jan. 3, 2002

(65) Prior Publication Data

US 2002/0137627 A1 Sep. 26, 2002

(30) Foreign Application Priority Data

Jan. 17, 2001 (JP) .......................... 2001-008792

(51) Int. Cl.[7] .............. B01J 27/25; B01J 21/18; B01J 21/08; B01J 23/00
(52) U.S. Cl. ............... 502/201; 502/180; 502/181; 502/182; 502/185; 502/240; 502/242; 502/250; 502/300; 502/350; 502/355
(58) Field of Search .............. 502/180–182, 502/185, 230, 250, 325, 406, 415, 416, 417, 201, 240, 242, 300, 350, 355; 588/901; 95/142, 901

(56) References Cited

U.S. PATENT DOCUMENTS

| 1,871,117 | A | | 8/1932 | Day | |
|---|---|---|---|---|---|
| 3,754,074 | A | | 8/1973 | Grantham | ............... 423/210.5 |
| 4,415,757 | A | * | 11/1983 | Pyke et al. | ............... 568/475 |
| 4,898,845 | A | * | 2/1990 | Datta et al. | ............... 502/3 |
| 4,943,643 | A | * | 7/1990 | Pennington et al. | ......... 549/532 |
| 4,959,486 | A | * | 9/1990 | Pennington | ............... 549/532 |
| 5,053,372 | A | | 10/1991 | Brownscombe | ............. 502/60 |
| 5,884,474 | A | | 3/1999 | Topsøe | |
| 5,942,099 | A | | 8/1999 | Nitschke et al. | ............. 205/617 |
| 6,565,820 | B1 | * | 5/2003 | Weimer et al. | ......... 423/240 S |

FOREIGN PATENT DOCUMENTS

| EP | 0 761 938 | 3/1997 |
|---|---|---|
| JP | 9-144528 | 6/1997 |
| WO | WO00/43109 | 7/2000 |

OTHER PUBLICATIONS

S. J. Jelles, et al., "Molten Salts as Promising Catalysts for Oxidation of Diesel Soot: Importance of Experimental Conditions in Testing Procedures", Applied Catalysis B: Environmental 21, 1999, pp. 35–49. Jan. 1999.

* cited by examiner

*Primary Examiner*—Mark L. Bell
*Assistant Examiner*—Patricia L. Hailey
(74) *Attorney, Agent, or Firm*—Oblon, Spivak, McClelland, Maier & Neustadt, P.C.

(57) ABSTRACT

A molten-salt type catalyst is adapted for purifying particulate materials, which are contained in an exhaust gas emitted from an internal combustion engine and contain carbon. It includes a solid support and a catalytic ingredient. The catalytic ingredient is loaded on the solid support, and includes at least one member selected from the group consisting of silver nitrate, alkali metal nitrate, alkaline-earth metal nitrate and rare-earth nitrate. The molten-type catalyst can efficiently burn and remove the particulate materials even in a low temperature range.

20 Claims, 4 Drawing Sheets

MOLTEN-SALT TYPE CATALYST

BACKGROUND OF THE INVENTION

1. Field of the Invention

The present invention relates to a molten-salt type catalyst which can efficiently purify particulate materials (hereinafter abbreviated to as "PM"), contained in an exhaust gas emitted from an internal combustion engine, such as a diesel engine, etc., in a range of exhaust gas temperature.

2. Description of the Related Art

"PM" are contained in an exhaust gas which is emitted from an internal combustion engine. The "PM" are composed of carbon, "SOF" (i.e., soluble organic fractions), polymerized organic compounds, sulfuric acid mists, and so on. In view of air pollution and adverse effects to human bodies, there arises a growing tendency toward the suppression of "PM" emission. In order to control the "PM" emission, there are two ways. One of them is to catch "PM" with a filter. The other one of them is to burn and remove "PM." The engineering developments have been carried out in which the two ways are applied independently or in which the both of them are combined.

In order to burn "PM," it is possible to think of using an oxidizing catalyst on which a noble metal, for example, Pt, and the like, is loaded. In this case, however, since the solid phase of "PM" and the solid phase of the oxidizing catalyst contact with each other, "PM" and the oxidizing catalyst contact with each other with a low probability. Accordingly, it is difficult to efficiently burn and purify "PM." In particular, the noble metal, such as Pt, hardly effects to appreciably burn and purify carbonaceous components, which are contained in "PM."

Hence, it was thought of turning a catalyst into a liquid phase and then contacting it with "PM." For instance, in Appl. Cat. B21 (1999) pp. 35–49, there is a report on molten-salt type catalysts, such as $Cs_2MoO_4$—$V_2O_5$, $CsVO_3$—$MoO_3$ and $CS_2SO_4$—$V_2O_5$. Such molten-salt type catalysts are used under the favorable conditions that they exhibit a high oxidizing capability, they evaporate less and the combustion temperature is low. In this literature, there is a description that $Cs_2MoO_4$—$V_2O_5$ and $CsVO_3$—$MoO_3$ were preferable catalysts because they exhibited high activities at 620 K (i.e., 347° C.) or more and were stable up to 1,025 K (i.e., 752° C.) in air.

Moreover, in Japanese Unexamined Patent Publication (KOKAI) No. 9-144,528, there is set forth a catalytic apparatus. In the catalytic apparatus, a eutectic composition, such as $Cs_2O \cdot V_2O_5$ and $K_2O_5 \cdot V_2O_5$, is loaded on a carrier, such as a monolithic substance. The eutectic composition has a melting point of from 300 to 500° C., and exhibits a catalytic activity in the combustion of soot.

In addition, in a Patent Cooperation Treaty International Publication No. W000/43,109 (PCT/JP00/00194), there is set forth that "PM" can be burned and purified by putting magnesium nitrate and magnesium carbonate in a liquid reservoir and contacting them with an exhaust gas at a temperature of from about 185 to 270° C.

A temperature of an exhaust gas, which is emitted from a diesel engine, is usually less than 300° C. Moreover, when a diesel engine is started, the temperature is much lower. Accordingly, when a molten-salt type catalyst has a melting point of 300° C. or more, it is not turned into a liquid phase in an exhaust gas which is emitted from a diesel engine. Consequently, it is difficult for such a molten-salt type catalyst to efficiently burn and remove "PM."

It is required that a molten-salt type catalyst be turned into a liquid phase. However, since it is turned into a liquid phase, there is a fear in that it is flowed to and is concentrated on a downstream side when it contacts with an exhaust gas flow. Hence, in the technology disclosed in Patent Cooperation Treaty International Publication No. W000/43,109, such a primitive technique as the liquid reservoir is employed. However, from the viewpoint of boarding the liquid reservoir onto an automobile, it is not practical because the liquid level is made unstable by increments of exhaust gas pressure, vibrations during driving, and so on.

SUMMARY OF THE INVENTION

The present invention has been developed in view of the aforementioned circumstances. It is therefore an object of the present invention to make a practical molten-salt type catalyst which can burn and remove "PM" even in a low temperature range, and which can be stably disposed in an exhaust system of an automobile.

A molten-salt type catalyst according to the present invention can achieve the aforementioned object. The present molten-salt type catalyst is adapted for purifying particulate materials, which are contained in an exhaust gas emitted from an internal combustion engine and containing carbon, and comprises: a solid support; and a catalytic ingredient loaded on the solid support including at least one member selected from the group consisting of silver nitrate, alkali metal nitrate, alkaline-earth metal nitrate and rare-earth nitrate.

The solid support can preferably be a basic support. Moreover, the catalytic ingredient can preferably include alkali metal nitrate. In addition, the catalytic ingredient can more preferably further include an oxidation facilitating ingredient.

Thus, in accordance with the present invention, not only it is possible to burn and remove "PM" even in a low temperature range, but also it is possible to stably dispose the present molten-salt type catalyst in an exhaust system of an automobile. Hence, the present molten-salt type catalyst is an extremely practical one.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

In a molten-salt type catalyst according to the present invention, a catalytic ingredient, which includes a molten salt, is loaded on a solid support. Therefore, when the molten salt is turned into a liquid phase, the catalytic ingredient is kept being adhered on the solid support by interaction between the catalytic ingredient and the solid support. Accordingly, there does not arise such a problem that the catalytic ingredient is flown to a downstream side. Moreover, since the catalytic ingredient is a solid at an ordinary temperature, it is easy to handle the present molten-salt type catalyst. Accordingly, it is possible to board the present molten-salt type catalyst in an exhaust gas flow passage of an exhaust system in the same manner as conventional 3-way catalysts.

Then, in the present molten-salt type catalyst, since the molten salt melts and turns into a liquid phase at a temperature of an exhaust gas which is emitted from a diesel engine and is substantially composed of carbon, the molten salts contact with "PM" with a higher probability so that combustion reactions of "PM" take place. Moreover, since the molten salt is turned into the liquid phase, "PM" are likely to be captured by the molten salt. With such an operation as well, the contacting probability is enhanced. Therefore, it is possible for the present molten-salt type catalyst to efficiently burn and purify "PM." In particular, when a molten salt, such as lithium nitrate, etc., which melts at an especially low temperature, is used, the contacting capacity of the present molten-salt type catalyst toward "PM" is upgraded. Consequently, It is possible for the present molten-salt type catalyst to burn and remove "PM" in a wide temperature range from a low temperature region to a high temperature region.

In addition, in the present molten-salt type catalyst, nitrate is used as the molten salt. Accordingly, even when the nitrate is decomposed in a high temperature region, the nitrate is generated again by nitrogen oxides which are contained in an exhaust gas. With the operation, the catalytic ingredient is regenerated. Thus, the present molten-salt type catalyst is good in terms of the durability.

As the solid support, it is possible to use alumina, zirconia, titania, silica, zeolite, and so on, which are used in conventional 3-way catalysts, and the like. However, it is especially preferable to use a basic support, such as magnesia spinel, zirconia, alkali metal oxide, alkaline-earth metal oxide and rare-earth oxide, etc. The alkaline-earth metal oxide can be magnesia, and so on. The rare-earth oxide can be lanthanum oxide, neodymium oxide, and the like. When such a basic support is used, solid phase reactions between the catalytic ingredient and the solid support are inhibited so that the present molten-salt type catalyst is improved in terms of the durability.

The catalytic ingredient includes at least one member selected from the group consisting of silver nitrate, alkali metal nitrate, alkaline-earth metal nitrate and rare-earth nitrate. As the alkali metal nitrate, it is possible to exemplify $KNO_3$, $CsNO_3$, $NaNO_3$, $LiNO_3$, and so on. As the alkaline-earth metal nitrate, it is possible to exemplify $Ba(NO_3)_2$, $Sr(NO_3)_2$, $Ca(NO_3)_2$, $Mg(NO_3)_2$, and the like. As the rare-earth nitrate, it is possible to exemplify $Y_2(NO_3)_3$, $La_2(NO_3)_3$, $Nd_2(NO_3)_3$, $Pr_2(NO_3)_3$, etc. It is possible to use one of them only, or it is possible to load a composite nitrate, in which a plurality of nitrates are composited, on the solid support. When nitrates are made into composite nitrates, the molten temperatures of the resulting composite nitrates are lowered in many cases.

As the composite nitrate, the following are preferable options: $AgNO_3$—$CsNO_3$, $CsNO_3$—$KNO_3$, $CsNO_3$—$NaNO_3$, $CsNO_3$—$LiNO_3$, $KNO_3$—$Mg(NO_3)_2$, $LiNO_3$—$NaNO_3$, $NaNO_3$—$Ca(NO_3)_2$, $NaNO_3$—$Mg(NO_3)_2$, $AgNO_3$—$KNO_3$—$NaNO_3$, $AgNO_3$—$NaNO_3$—$Ba(NO_3)_2$, $KNO_3$—$LiNO_3$—$NaNO_3$, $KNO_3$—$NaNO_3$—$Mg(NO_3)_2$, $KNO_3$—$Ba(NO_3)_2$—$Ca(NO_3)_2$, $KNO_3$—$Ba(NO_3)_2$—$Sr(NO_3)_2$, $KNO_3$—$Ca(NO_3)_2$—$Sr(NO_3)_2$, $LiNO_3$—$NaNO_3$—$Ca(NO_3)_2$, $NaNO_3$—$Ca(NO_3)_2$—$Mg(NO_3)_2$, $NaNO_3$—$Ca(NO_3)_2$—$Sr(NO_3)_2$, $KNO_3$—$NaNO_3$—$Ca(NO_3)_2$—$Mg(NO_3)_2$, and the like. When one of the composite nitrates is used, it is possible to control the melting point of the catalytic ingredient at 200° C. or less.

As the nitrate which is included in the catalytic ingredient, it is desirable to use nitrate which exhibits a low melting point and a high decomposition temperature. With such characteristics, it is possible for the present molten-salt type catalyst to efficiently burn and remove "PM" in an exhaust gas of a greater space velocity in a wider temperature range. For instance, among the aforementioned catalytic ingredients, the nitrates, which include alkali metal nitrate, are more preferable options. Moreover, the nitrates, which include $LiNO_3$, are the most preferable options.

A loading amount of the catalytic ingredient can desirably fall in a range of from 1 to less than 120 parts by weight with respect to 100 parts by weight of the solid support. When the loading amount is less than the lower limit, it might be difficult for the resulting molten-salt type catalyst to burn "PM." Note that the higher the loading amount of the catalytic ingredient is, the lower the combustion temperatures of "PM" tend to decrease. However, when the catalytic ingredient is loaded in an amount of 120 parts by weight or more with respect to 100 parts by weight of the solid support, there might arise a case where the stability of the catalytic ingredient is insufficient on the solid support so that the catalytic ingredient is flown to a downstream side to agglomerate thereat. Accordingly, it is desirable to control the loading amount of the catalytic ingredient less than 120 parts by weight with respect to 100 parts by weight of the solid support. The loading amount can more desirably fall in a range of from 5 to 50 parts by weight with respect to 100 parts by weight of the solid support.

The catalytic ingredient can more desirably include an oxidation facilitating ingredient. With the oxidation facilitating ingredient, it is possible for the present molten-salt type catalyst to facilitate the combustion of "PM" by oxidizing "SOF" which are contained in "PM." As the oxidation facilitating ingredient, it is possible to use noble metals, a variety of oxides, and so on. The noble metal can be Pt, Pd, Rh, and the like. The oxide can be $CeO_2$, $ZrO_2$, $CeO_2$-$ZrO_2$ solid solutions, BaO, CaO, $V_2O_5$, ZnO, $WO_3$, $MoO_3$, NiO, FeO, $Fe_3O_4$, $Fe_2O_3$, $MnO_2$, $Cr_2O_3$, CuO, CoO, $Co_3O_4$, etc. Among them, the oxidation facilitating ingredient can especially desirably include Pt. Pt effects not only to oxidize "SOF" but also to reduce $NO_x$ which are contained in "PM." Moreover, when Pt is loaded adjacent to the catalytic ingredient loaded on the solid support, it carries out regenerating the catalytic ingredient which is decomposed at an elevated temperature. Consequently, the present molten-salt type catalyst is enhanced in terms of the durability.

When the oxidation facilitating ingredient is the noble metal, it can preferably be loaded in an amount of from 0.1 to 10 parts by weight, further preferably from 1 to 5 parts, with respect to 100 parts by weight of the solid support. When the oxidation facilitating ingredient is the metal oxide, it can preferably be loaded in an amount of from 1 to 50 parts by weight, further preferably from 5 to 40 parts by weight, with respect to 100 parts by weight of the solid support. When the oxidation facilitating ingredients are loaded less than the lower limits, the advantages are not produced. When they are loaded more than the upper limits, not only the advantages saturate but also the addition might result in adverse affects.

The catalytic ingredient can be loaded on the solid support in the following manner. An aqueous solution of the catalytic ingredient can be impregnated into the solid support, and the solid support can thereafter be dried. Moreover, the oxidation facilitating ingredient can be further loaded on the solid support in the following fashion. The solid support can be immersed into an aqueous solution of the oxidation facilitating ingredient, and can thereafter be calcined.

A configuration of the present molten-salt type catalyst is not limited in particular. The present molten-salt type catalyst can be formed as a pellet-like shape, a filter-like shape, a foam-like shape, a flow-through type monolith-like shape, and so on. For example, when it is formed as a filter-like shape, a monolith-like shape or a foam-like shape, it can be manufactured by coating the solid support on a surface of a substrate having such a configuration and loading the catalytic ingredient on the coated solid support. Note that a configuration is desirable which turns an exhaust gas into a turbulent flow. Hence, it is preferable to form a substrate as a foam-like shape. Moreover, as a material of the substrate, it is possible to use heat-resistant ceramics, metals, and the like, similarly to conventional 3-way catalysts.

Moreover, it is preferable to arrange the present molten-salt type catalyst in the following manner, for instance. The present molten-salt type catalyst can comprise a housing and a packed structural member. The housing constitutes a flow passage therein. In the packed structural member, one or more units are packed in series in the central axis direction of the housing. The unit includes a bulk-shaped member, a longitudinal plate and a lateral plate. The bulk-shaped member has a maximum diameter smaller than an inside diameter of the housing. The longitudinal plate is formed as a plate, has a longitudinal major surface having a maximum area and disposed substantially parallel to the central axis direction of the housing, contacts with the bulk-shaped member and an inner surface of the housing, and is disposed between the bulk-shaped member and the inner surface of the housing. The lateral plate is formed as a plate, has a lateral major surface having a maximum area and disposed substantially vertical to the central axis direction of the housing, and contacts with the longitudinal plate as well as the bulk-shaped member and an inner surface of the housing. The bulk-shaped member, the longitudinal plate and the lateral plate constitute the solid support, and each of them is loaded with the catalytic ingredient. With such an arrangement, when an exhaust gas flows into the housing, it is turned into a turbulent flow, and contacts with the solid support with an extremely enlarged area. Accordingly, it is possible to efficiently burn and remove "PM" which are contained in the exhaust gas.

Hereinafter, the present invention will be described in detail with reference to test samples, examples and comparative examples.

Test Sample No. 1

A variety of catalytic powders of molten salts set forth in Table 1 below were prepared. Each of the catalytic powders were mixed respectively with a carbon black so that the mixing ratio was the respective catalytic powders:the carbon black=2:1 by weight. Then, the respective mixtures were measured by TG-DSC (thermogravimetric analysis and differential thermal analysis). The temperature at which the carbon black was oxidized by 50% was determined by TG and the melting point of the molten salt was determined by DSC. The results are illustrated in FIG. 1.

TABLE 1

| Identification | Species of Molten Salt |
| --- | --- |
| a | $Ba(NO_3)_2$ |
| b | $Sr(NO_3)_2$ |
| c | $KNO_3$ |
| d | $KNO_3$—$NaNO_3$ |
| e | $KNO_3$—$AgNO_3$ |
| f | $NaNO_3$ |
| g | $AgNO_3$ |
| h | $Ca(NO_3)_2.4H_2O$ |
| i | $CsNO_3$ |
| j | $LiNO_3$ |
| A | $V_2O_5$ |
| B | $KCl$—$KVO_3$ |
| C | $Cs_2MoO_4$—$V_2O_5$ |
| D | $CsVO_3$—$MoO_3$ |

Figure 1:
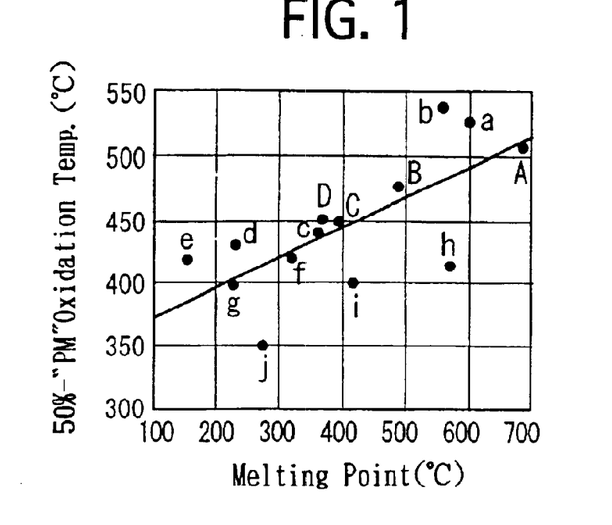
FIG. 1 is a graph for illustrating relationships between melting points and 50%-"PM" oxidation temperatures which were exhibited by respective molten salts.

It is understood from FIG. 1 that, compared with the conventional oxide-based molten salts "A" through "D," the nitrate-based molten salts "a" through "j" exhibited lower temperatures in terms of both of the melting point and the 50%-"PM" oxidation temperature, and that they had good performance as a catalyst for burning "PM."

Test Sample No. 2

Figure 2:
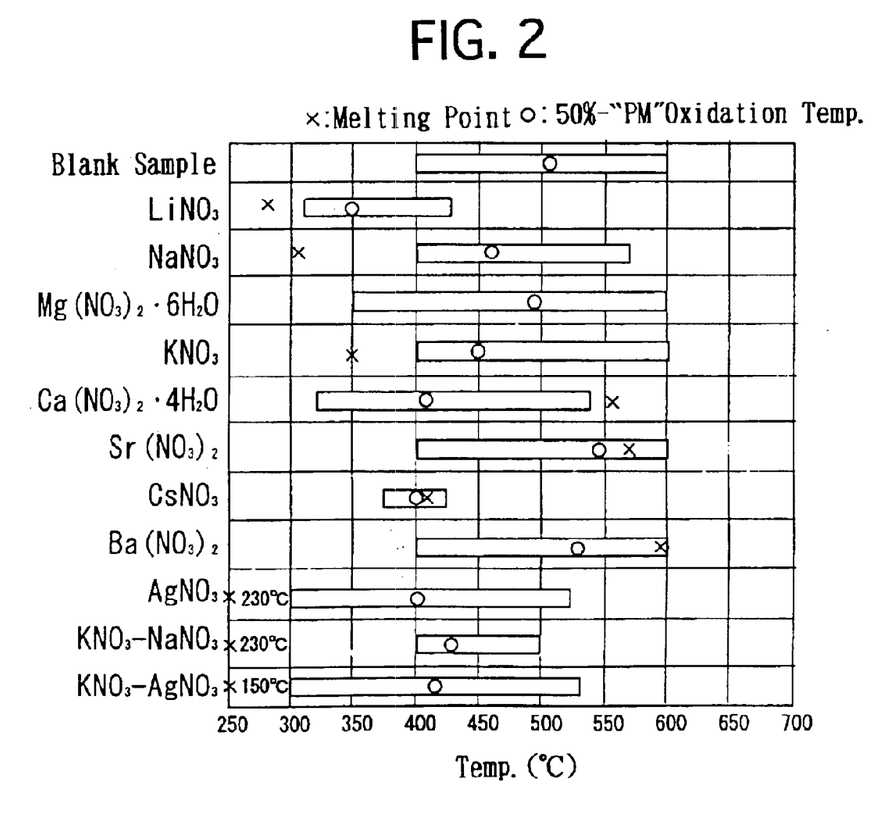
FIG. 2 is a graph for illustrating melting points, 50%-"PM" oxidation temperatures and "PM" combustion temperature ranges which were exhibited by respective molten salts.

A variety of catalytic powders of molten salts set forth in FIG. 2 were prepared. Each of the catalytic powders were mixed respectively with a carbon black so that the mixing ratio was the respective catalytic powders:the carbon black= 2:1 by weight. Then, the respective mixtures were measured by TG-DSC. The temperature range in which the carbon black was burned was determined by TG and DSC. The temperature at which the carbon black was oxidized by 50% was determined by TG. The results are illustrated in FIG. 2. FIG. 2 partially overlaps with FIG. 1. The ranges, which are depicted by blank rectangles, are temperature ranges in which "PM" could be burned. Note that, as a blank sample, the carbon black itself was similarly measured for the temperatures.

It is appreciated from FIG. 2 that the combustion temperature ranges of the carbon black were lowered by mixing the nitrate-based molten salts with the carbon black, and that $LiNO_3$ was especially preferable.

In Patent Corporation Treaty International Publication No. W000/43,109 (PCT/JP00/00194), there is a description that "PM" were burned in a temperature range of from 260 to 300° C. when a magnesium nitrate catalytic powder was used. However, it is held true when a liquid reservoir is used and a catalyst exists abundantly therein. When a catalyst content falls in such a small range that catalyst powder:carbon black=2:1, it is understood that alkali metal nitrates are especially effective, and that magnesium nitrate is not effective at all. Specifically, it is an engineering idea in Patent Corporation Treaty International Publication No. W000/43, 109 (PCT/JP00/00194) to burn a small amount of "PM" with a large amount of molten salt. On the other hand, it is an engineering idea in the present invention that to continuously burn "PM" with a small amount of molten salt.

EXAMPLE No. 1

With respect to a predetermined amount of a magnesia spinel powder, a $KNO_3$ aqueous solution having a predetermined concentration was impregnated in a predetermined amount. The magnesia spinel powder was dried, thereby preparing a catalyst of Example No. 1. Note that the loading amount of $KNO_3$ was 4 g with respect to 100 g of the magnesia spinel powder.

The catalyst was subjected to a durability test in which it was held at 600° C., which was well over the melting point of $KNO_3$ (e.g., 339° C.), for 3 hours. Thereafter, the catalyst was observed with an x-ray diffractometer. As a result, it was found out that no reactions took place between the magnesia spinel powder and $KNO_3$. Moreover, although the testing temperature exceeded the decomposition temperature of $KNO_3$ (e.g., 400° C.), the decomposition of $KNO_3$ was developed barely partially. Thus, it was discovered that the loaded $KNO_3$ was stabilized by the magnesia spinel powder.

Comparative Example No. 1

With respect to a predetermined amount of an $Al_2O_3$ powder, a dinitrodiammine platinum aqueous solution having a predetermined concentration was impregnated in a predetermined amount. The $Al_2O_3$ powder was dried, thereby preparing a catalyst of Comparative Example No. 1. Note that the loading amount of Pt was 2 g with respect to 100 g of the $Al_2O_3$ powder.

Comparative Example No. 2

With respect to a predetermined amount of an $Al_2O_3$ powder, a dinitrodiammine platinum aqueous solution having a predetermined concentration was impregnated in a predetermined amount. The $Al_2O_3$ powder was dried and calcined. Thereafter, a barium acetate aqueous solution having a predetermined concentration was impregnated into the $Al_2O_3$ powder in a predetermined amount. Then, the $Al_2O_3$ powder was dried and calcined, thereby preparing a catalyst of Comparative Example No. 2. Note that the loading amount of Pt was 2 g and the loading amount of Ba was 0.2 mol with respect to 100 g of the $Al_2O_3$ powder, respectively.

Comparative Example No. 3

With respect to a predetermined amount of a $CeO_2$ powder, a dinitrodiammine platinum aqueous solution having a predetermined concentration was impregnated in a predetermined amount. The $CeO_2$ powder was dried and calcined, thereby preparing a catalyst of Comparative Example No. 3. Note that the loading amount of Pt was 2 g with respect to 100 g of the $CeO_2$ powder.

Comparative Example No. 4

With respect to a predetermined amount of an $SiO_2$ powder, a dinitrodiammine platinum aqueous solution having a predetermined concentration was impregnated in a predetermined amount. The $SiO_2$ powder was dried and calcined, thereby preparing a catalyst of Comparative Example No. 4. Note that the loading amount of Pt was 2 g with respect to 100 g of the $SiO_2$ powder.

Test Sample No. 3

The catalytic powders of above-described Example No. 1 as well as Comparative Example Nos. 1 through 4 were mixed with a carbon black so that the mixing ratio was the respective catalyst powders:the carbon black=2:1 by weight. Then, the resulting mixtures were heated in an He gas atmosphere, which contained $O_2$ in an amount of 10% by volume. While increasing the temperature at a rate of 40° C./min., the amounts of $CO_2$ generating from the respective mixtures were measured continuously. Note that, as a blank sample, the carbon black itself was measured for the $CO_2$ generation. The $CO_2$ generation ratios were calculated at the respective temperatures. The results are illustrated in FIG. 3.

Figure 3:
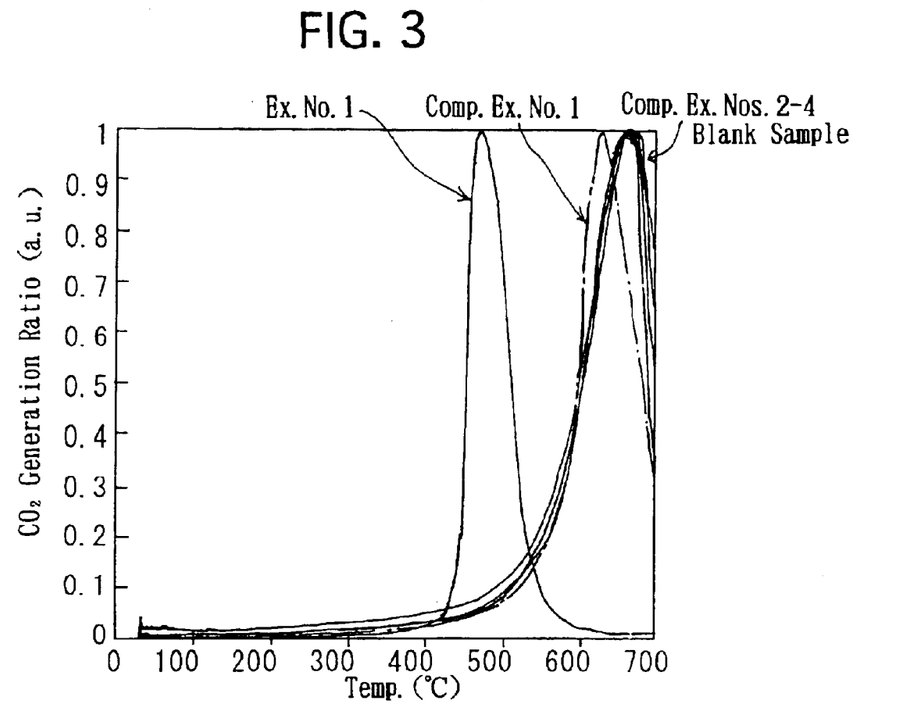
FIG. 3 is a graph for illustrating peak temperatures at which molten-salt type catalysts of Example No. 1 as well as Comparative Example Nos. 1, 2, 3 and 4 generated $CO_2$.

It is appreciated from FIG. 3 that the catalyst of Example No. 1 exhibited the combustion temperature lower by about 150° C. than those of the conventional oxidizing catalysts of Comparative Example Nos. 1, 3 and 4 as well as that of the conventional $NO_x$-storage-and-reduction type catalyst of Comparative Example No. 2. Moreover, it is seen that the catalysts of the respective comparative catalysts hardly contributed to the oxidation of the carbon black.

EXAMPLE No. 2

A foam-shaped substrate was prepared, and was coated to form a coating layer with a magnesia spinel powder by wash-coating. Note that the coating amount was 100 g with respect to 1 L of the substrate. Subsequently, a $KNO_3$ aqueous solution having a predetermined concentration was impregnated into the coating layer. Then, the coating layer was dried, thereby preparing a catalyst of Example No. 2. Note that the loading amount of $KNO_3$ was 20 g with respect to 1 L of the substrate.

EXAMPLE No. 3

Except that an $LiNO_3$ aqueous solution was used instead of the $KNO_3$ aqueous solution, a catalyst of Example No. 3 was prepared in the same manner as Example No. 2. Note that the loading amount of $LiNO_3$ was 20 g with respect to 1 L of the substrate.

Comparative Example No. 5

Except that a mixture powder, which included an $Al_2O_3$ powder, a $TiO_2$ powder, a $CeO_2$ powder and a $ZrO_2$ powder with Rh loaded, was used instead of the magnesia spinel powder, a coating layer was formed in the same manner as Example No. 2. Subsequently, a dinitrodiammine platinum aqueous solution having a predetermined concentration was impregnated into the coating layer in a predetermined amount. Then, the coating layer was dried and calcined. Thereafter, a barium acetate aqueous solution having a predetermined concentration was impregnated into the coating layer in a predetermined amount. Then, the coating layer was dried and calcined. Subsequently, Li and K were similarly loaded on the coating layer by using a lithium acetate aqueous solution and a potassium acetate aqueous solution, thereby preparing a catalyst of Comparative Example No. 5. Note that Pt was loaded in an amount of 2 g, Ba was loaded in an amount of 0.2 mol, each of Li and K was loaded in an amount of 0.1 mol, and Rh was loaded in an amount of 0.5 g with respect to 1 L of the substrate, respectively.

Test Sample No. 4

The catalysts of Example Nos. 2 and 3 as well as Comparative Example No. 5 were installed to an exhaust system of a diesel engine, respectively. Then, "PM" were captured onto the catalysts under the following conditions:

| Number of Engine Revolutions: | 2,500 rpm; |
|---|---|
| Torque: | 31.4 Nm; and |
| Exhaust Gas Temperature: | 200° C. |

Figure 4:
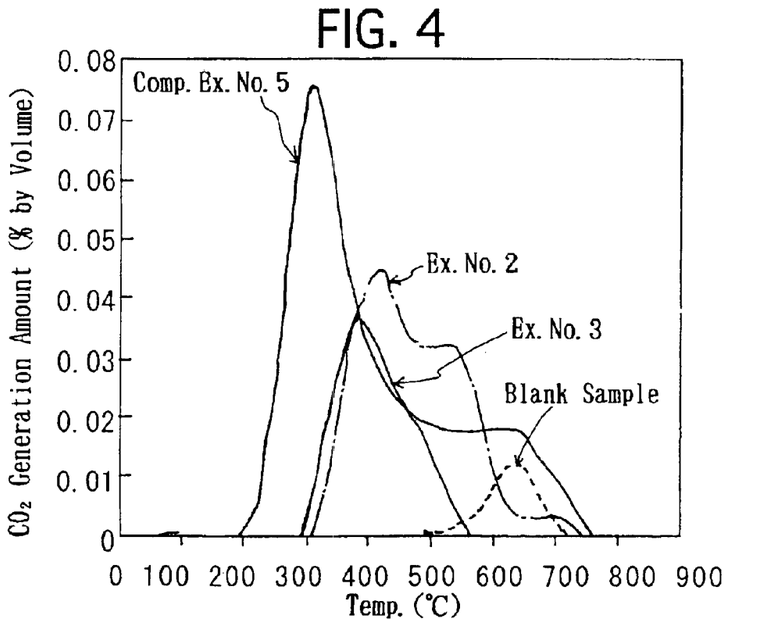
FIG. 4 is a graph for illustrating relationships between $CO_2$ generation amounts and temperatures which were exhibited by molten-salt type catalysts of Example Nos. 2 and 3 as well as Comparative Example No. 5.

Then, the respective catalysts with captured "PM" were taken out of the exhaust system, respectively. Then, the respective catalysts were heated in an $N_2$ gas atmosphere, which contained $O_2$ in an amount of 10% by volume. While increasing the temperature at a rate of 20° C./min., the amounts of $CO_2$ generating from the respective catalysts were measured continuously. Note that, as a blank sample, "PM" were similarly captured onto a substrate, which was free from the coating layer and catalytic ingredients, the amounts of $CO_2$ generating therefrom were measured in the same manner. The results are illustrated in FIG. 4. Note that, in FIG. 4, the vertical axis specifies the generated $CO_2$ by volumetric percentages.

Figure 5:
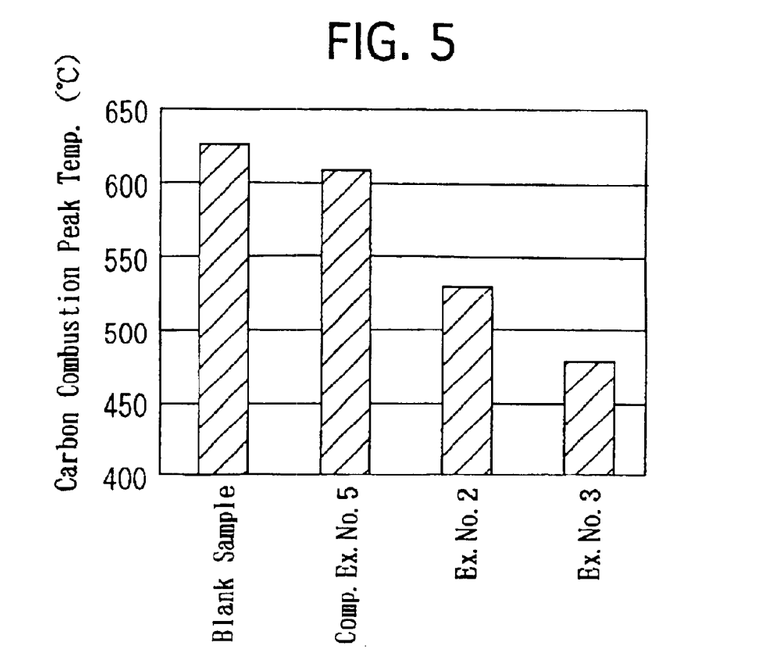
FIG. 5 is a graph for illustrating carbon combustion peak temperatures which were exhibited by Example Nos. 2 and 3 as well as Comparative Example No. 5.

In FIG. 4, it is recognized that two peaks existed in the $CO_2$ generation temperatures. At 450° C. or less, $CO_2$ was generated by the combustion of "SOF" components which were contained in "PM." At temperatures of more than 450° C., $CO_2$ was generated by the combustion of carbonaceous components which were contained in "PM." Therefore, the peak temperatures of the combustion of carbonaceous components in FIG. 4 were extracted therefrom. The results are illustrated in FIG. 5.

It is understood from FIG. 4 that, in the catalyst of Comparative Example No. 5, $CO_2$, which resulted from the combustion of "SOF" components, was generated more, and that the combustion temperature was as low as 300° C. This is due to the high oxidizing activities of the noble metal ingredients which were loaded on the catalyst. However, the catalyst of Comparative Example No. 5 exhibited the combustion temperature of carbonaceous components at 610° C. as illustrated in FIG. 5. Compared with 630° C. exhibited by the blank sample, it is hardly appreciated that the catalyst of Comparative Example No. 5 effected the combustion of carbonaceous components.

On the other hand, it is recognized that the catalysts of Example Nos. 2 and 3 exhibited the combustion temperatures of carbonaceous components which were lowered greatly with respect to that of the blank sample. Thus, it is apparent that the catalysts of Example Nos. 2 and 3 had high performance as a catalyst for burning "PM."

Comparative Example No. 6

Except that an $Al_2O_3$ powder was used instead of the magnesia spine powder, a coating layer was formed in the same manner as Example No. 2. Subsequently, a dinitrodiammine platinum aqueous solution having a predetermined concentration was impregnated into the coating layer in a predetermined amount. Then, the coating layer was dried and calcined, thereby preparing a catalyst of Comparative Example No. 6. Note that Pt was loaded in an amount of 2 g with respect to 1 L of the substrate.

Comparative Example No. 7

Except that a $CeO_2$-$ZrO_2$ solid solution powder was used instead of the magnesia spinel powder, a coating layer was formed in the same manner as Example No. 2. Subsequently, a dinitrodiammine platinum aqueous solution having a predetermined concentration was impregnated into the coating layer in a predetermined amount. Then, the coating layer was dried and calcined, thereby preparing a catalyst of Comparative Example No. 7. Note that Pt was loaded in an amount of 2 g with respect to 1 L of the substrate.

Test Sample No. 5

The catalysts of Example No. 2 as well as Comparative Example Nos. 6 and 7 were installed to an exhaust system of a diesel engine, respectively. Then, "PM" were captured onto the catalysts for 1 hour, respectively, in the same manner as Test Sample No. 4. The amounts of the captured "PM" were measured. The results are set forth in Table 2 below.

TABLE 2

|  | C. I./S.*[1] | C. "PM" A.*[2] (g) |
|---|---|---|
| Ex. #2 | $KNO_3$/$MgAl_2O_4$ | 0.11 |
| Comp. Ex. #6 | Pt/$Al_2O_3$ | 0.08 |
| Comp. Ex. #7 | Pt/$CeO_2$—$ZrO_2$ | 0.07 |

Note:
*[1]stands for "Catalytic Ingredient/Support."
*[2]stands for "Captured 'PM' Amount."

It is apparent from Table 2 that the catalyst of Example No. 2 captured "PM" in the largest amount. This is because the catalytic ingredient was turned into a liquid phase. Thus, it is understood that the present molten-salt type catalyst can capture "PM" very well.

EXAMPLE No. 4

Except that the loading amount of $KNO_3$ was made 100 g with respect 1 L of the substrate, a catalyst of Example No. 4 was prepared in the same manner as Example No. 2.

EXAMPLE No. 5

Except that an $LiNO_3$ aqueous solution was used instead of the $KNO_3$ aqueous solution, and that the loading amount of $LiNO_3$ was made 100 g with respect 1 L of the substrate, a catalyst of Example No. 5 was prepared in the same manner as Example No. 2.

Test Sample No. 6

Figure 6:
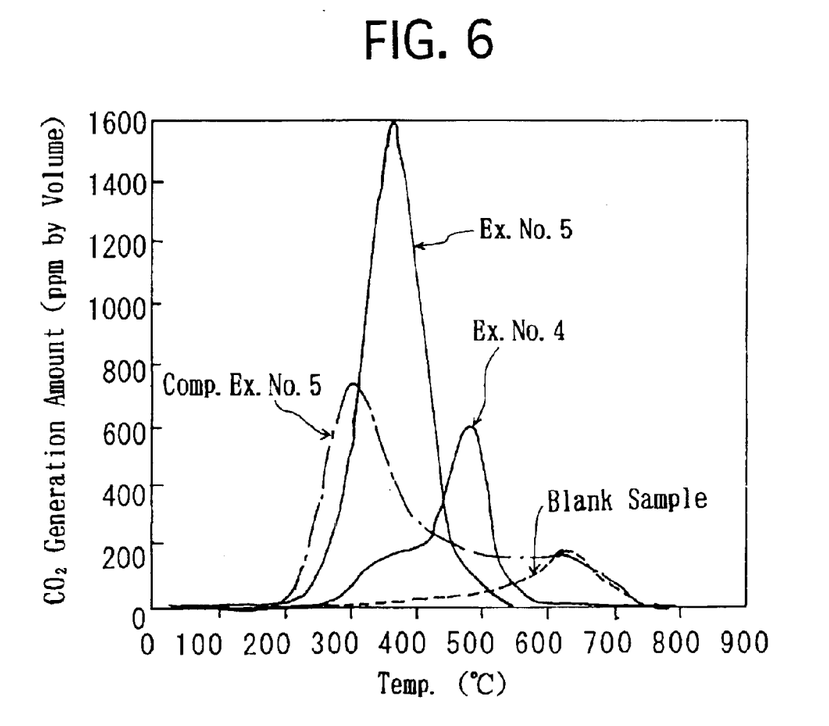
FIG. 6 is a graph for illustrating relationships between $CO_2$ generation amounts and temperatures which were exhibited by molten-salt type catalysts of Example Nos. 4 and 5 as well as Comparative Example No. 5.

The catalysts of Example Nos. 4 and 5, Comparative Example No. 5 as well as a blank substrate were installed to an exhaust system of a diesel engine, respectively. Then, the amounts of $CO_2$ generating from the respective catalysts were measured in the same manner as Test Sample No. 4. The results are illustrated in FIG. 6. The peak temperatures of the combustion of carbonaceous components in FIG. 6 were extracted therefrom. The results are illustrated in FIG. 7.

Figure 7:
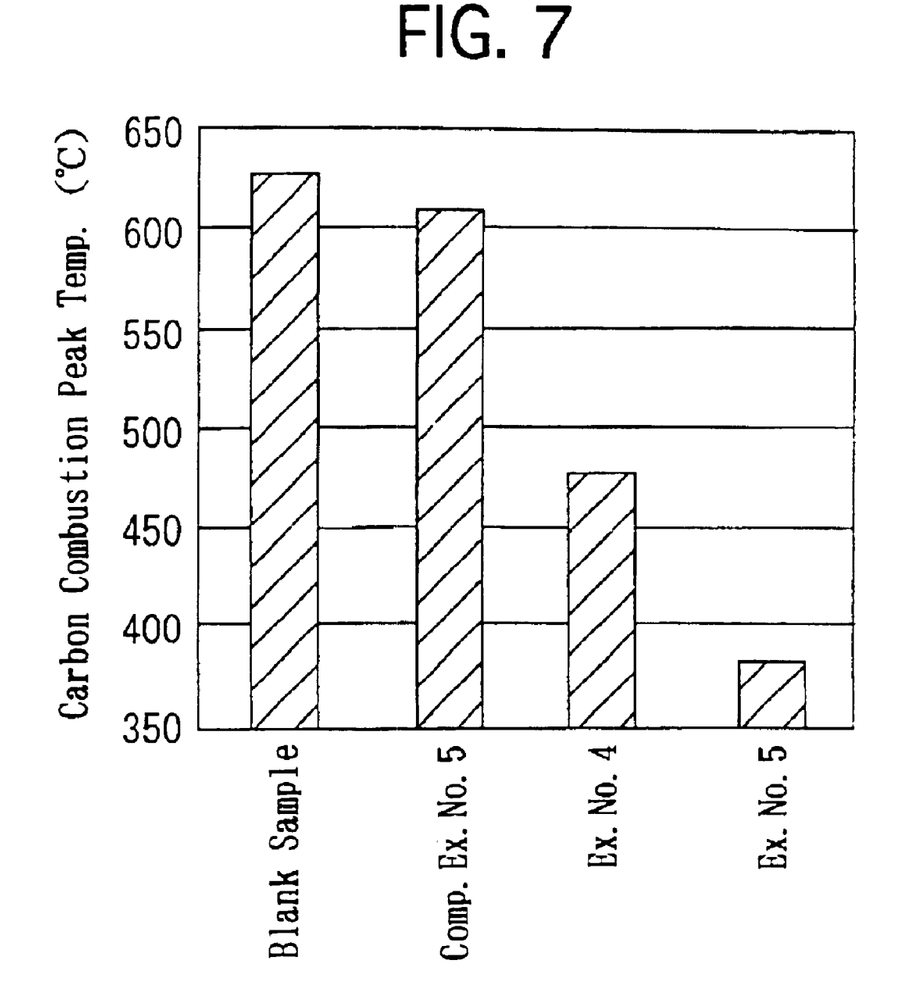
FIG. 7 is a graph for illustrating carbon combustion peak temperatures which were exhibited by Example Nos. 4 and 5 as well as Comparative Example No. 5.

By comparing FIG. 4 with FIG. 6 and by comparing FIG. 5 with FIG. 7, it is appreciated that the larger the loading amount of nitrate was, the lower the temperature range of the carbonaceous components combustion moved toward a low temperature side and the greater amount of $CO_2$ was generated by the combustion of carbonaceous components.

Having now fully described the present invention, it will be apparent to one of ordinary skill in the art that many changes and modifications can be made thereto without departing from the spirit or scope of the present invention as set forth herein including the appended claims.

What is claimed is:

1. A molten-salt catalyst for purifying particulate materials, which are contained in an exhaust gas emitted from an internal combustion engine for an automobile and contain carbon, and said catalyst comprising:
   a solid support; and
   a catalytic ingredient loaded on the solid support including at least one member selected from the group consisting of silver nitrate, alkali metal nitrate, alkaline-earth metal nitrate and rare-earth nitrate,
   wherein said catalytic ingredient further includes an oxidation facilitating ingredient.

2. The molten-salt catalyst according to claim 1, wherein said solid support is a basic support.

3. The molten-salt catalyst according to claim 1, wherein said catalytic ingredient includes alkali metal nitrate.

4. The molten-salt catalyst according to claim 1, wherein a loading amount of said catalytic ingredient falls in a range of from 1 to less than 120 parts by weight with respect to 100 parts by weight of said solid support.

5. The molten-salt catalyst according to claim 1, wherein said oxidation facilitating ingredient is at least one member selected from the group consisting of noble metal and oxide.

6. The molten-salt catalyst according to claim 5, wherein said noble metal is at least one member selected from the group consisting of Pt, Pd and Rh.

7. The molten-salt catalyst according to claim 5, wherein said oxide is at least one member selected from the group consisting of $CeO_2$, $ZrO_2$, $CeO_2$-$ZrO_2$ solid solutions, BaO, CaO, $V_2O_5$, ZnO, $WO_3$, $MoO_3$, NiO, FeO, $Fe_3O_4$, $Fe_2O_3$, $MnO_2$, $Cr_2O_3$, CuO, CoO and $Co_3O_4$.

8. The molten-salt catalyst according to claim 5, wherein a loading amount of said noble metal falls in a range of from 0.1 to 10 parts by weight with respect to 100 parts by weight of said solid support.

9. The molten-salt catalyst according to claim 5, wherein a loading amount of said metal oxide falls in a range of from 1 to 50 parts by weight with respect to 100 parts by weight of said solid support.

10. A molten-salt catalyst for purifying particulate materials, which are contained in an exhaust gas emitted from an internal combustion engine for an automobile and contain carbon, and said catalyst comprising:
    a solid support; and
    a catalytic ingredient loaded on the solid support wherein said catalytic ingredient is a composite nitrate including at least one member selected from the group consisting of silver nitrate, alkali metal nitrate, alkaline-earth metal nitrate and rare-earth nitrate.

11. The molten-salt catalyst according to claim 10, wherein said solid support is a basic support.

12. The molten-salt catalyst according to claim 11, wherein said basic support includes at least one member selected from the group consisting of magnesia spinel, zirconia, alkali metal oxide, alkaline-earth metal oxide and rare-earth oxide.

13. The molten-salt catalyst according to claim 10, wherein said catalytic ingredient includes alkali metal nitrate.

14. The molten-salt catalyst according to claim 10, wherein said solid support includes at least one member selected from the group consisting of alumina, zirconia, titania, silica and zeolite.

15. The molten-salt catalyst according to claim 10, wherein said alkali metal nitrate is at least one member selected from the group consisting of $KNO_3$, $CsNO_3$, $NaNO_3$ and $LiNO_3$.

16. The molten-salt type catalyst according to claim 10, wherein said composite nitrate is at least one member selected from the group consisting of $AgNO_3$-$CsNO_3$, $CsNO_3$-$KNO_3$, $CsNO_3$-$NaNO_3$, $CsNO_3$-$LiNO_3$, $KNO_3$-$Mg(NO_3)_2$, $LiNO_3$-$NaNO_3$, $NaNO_3$-$Ca(NO_3)_2$, $NaNO_3$-$Mg(NO_3)_2$, $AgNO_3$-$KNO_3$-$NaNO_3$, $AgNO_3$-$NaNO_3$-$Ba(NO_3)_2$, $KNO_3$-$LiNO_3$-$NaNO_3$, $KNO_3$-$NaNO_3$-$Mg(NO_3)_2$, $KNO_3$-$Ba(NO_3)_2$-$Ca(NO_3)_2$, $KNO_3$-$Ba(NO_3)_2$-$Sr(NO_3)_2$, $KNO_3$-$Ca(NO_3)_2$-$Sr(NO_3)_2$, $LiNO_3$-$NaNO_3$-$Ca(NO_3)_2$, $NaNO_3$-$Ca(NO_3)_2$-$Mg(NO_3)_2$, $NaNO_3$-$Ca(NO_3)_2$-$Sr(NO_3)_2$ and $KNO_3$-$NaNO_3$-$Ca(NO_3)_2$-$Mg(NO_3)_2$.

17. The molten-salt catalyst according to claim 16, wherein said alkali metal nitrate includes $LiNO_3$ at least.

18. The molten-salt catalyst according to claim 10, wherein a loading amount of said catalytic ingredient falls in a range of from 1 to less than 120 parts by weight with respect to 100 parts by weight of said solid support.

19. A molten-salt catalyst for purifying particulate materials, which are contained in an exhaust gas emitted from an internal combustion engine for an automobile and contain carbon, and said catalyst comprising:
    a solid support, wherein said solid support is selected from the group consisting of magnesia, lanthanum oxide, and neodymium oxide; and
    a catalytic ingredient loaded on the solid support including at least one member selected from the group consisting of silver nitrate, alkali metal nitrate, alkaline-earth metal nitrate and rare-earth nitrate.

20. A molten-salt catalyst for purifying particulate materials, which are contained in an exhaust gas emitted from an internal combustion engine for an automobile and contain carbon, and said catalyst comprising:
    a solid support; and
    a catalytic ingredient loaded on the solid support including at least one member selected from the group consisting of an alkaline-earth metal nitrate, wherein said alkaline-earth metal nitrate is at least one member selected from the group consisting of $Ba(NO_3)_2$, $Sr(NO_3)_2$, $Ca(NO_3)_2$ and $Mg(NO_3)_2$, and rare-earth nitrate, wherein said rare-earth nitrate is at least one member selected from the group consisting of $Y_2(NO_3)_3$, $La_2(NO_3)_3$, $Nd_2(NO_3)_3$ and $Pr_2(NO_3)_3$.

* * * * *